(12) United States Patent
Park

(10) Patent No.: US 6,741,850 B1
(45) Date of Patent: May 25, 2004

(54) APPARATUS AND METHODS FOR MANAGING BILLING INFORMATION IN DIGITAL PORTABLE CORDLESS TELEPHONE

(75) Inventor: Hyoung-Nae Park, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/158,122

(22) Filed: Sep. 21, 1998

(30) Foreign Application Priority Data

Sep. 19, 1997 (KR) ............................................ 97-47695

(51) Int. Cl.⁷ ............................................ H04M 11/00
(52) U.S. Cl. ........................ 455/407; 455/405; 455/406
(58) Field of Search ................................. 455/405, 406, 455/407, 408, 557, 558, 410, 411, 550, 550.1, 403; 379/354, 114.01

(56) References Cited

U.S. PATENT DOCUMENTS

| 4,585,904 A | * | 4/1986 | Mincone et al. | 379/114.01 |
| 5,517,549 A | * | 5/1996 | Lee | 455/407 |
| 5,577,100 A | * | 11/1996 | McGregor et al. | 455/406 |
| 5,687,216 A | * | 11/1997 | Svensson | 455/412 |
| 5,761,624 A | * | 6/1998 | Mooney et al. | 455/558 |
| 5,774,802 A | * | 6/1998 | Tell et al. | 455/408 |
| 5,848,138 A | * | 12/1998 | Sarpola et al. | 379/114.01 |
| 5,859,903 A | * | 1/1999 | Lee | 379/157 |
| 5,937,346 A | * | 8/1999 | Ono | 455/411 |
| 5,946,614 A | * | 8/1999 | Robbins et al. | 455/407 |
| 6,148,191 A | * | 11/2000 | Kim | 455/407 |
| 6,408,174 B1 | * | 6/2002 | Steijer | 416/223 A |

* cited by examiner

Primary Examiner—Sonny Trinh
(74) Attorney, Agent, or Firm—Dilworth & Barrese LLP

(57) ABSTRACT

Apparatus and methods for managing billing information in a digital portable cordless telephone are provided. An illustrative embodiment of a method for managing billing information of call services in a digital portable cordless telephone having a non-volatile memory comprises the steps of: calculating a service charge for a call service when a completion of the call service is sensed; and storing the calculated service charge in a memory location of the non-volatile memory corresponding to a specified address. The method may further comprise the steps of: searching for an address of the non-volatile memory linked to the specified address at which the calculated service charge is stored; and storing a telephone number associated with the call service in a memory location of the non-volatile memory corresponding to the searched address.

14 Claims, 5 Drawing Sheets

| No. | CHARGE | SERVICE TIME | TELEPHONE NUMBER | KIND |
|-----|--------|--------------|------------------|------|
| 1 | 5,000 | 20MINUTE | (053) 745-0084 | OUTGOING |
| 2 | 70 | 3MINUTE | 568-1274 | INCOMING |
| 3 | 1,200 | 17MINUTE | (0331) 280-3678 | MEMO |
| 4 ← ADD | ... | ... | ... | |
| ... | ... | ... | ... | ... |

FIG. 2

APPARATUS AND METHODS FOR MANAGING BILLING INFORMATION IN DIGITAL PORTABLE CORDLESS TELEPHONE

BACKGROUND OF THE INVENTION

1. Field of the Invention

The present invention relates to digital portable cordless telephones and, more particularly, to apparatus and methods for managing billing information in a digital portable cordless telephone.

2. Description of the Related Art

In the case that a call service (e.g., the last incoming or outgoing call) is performed using a digital portable cordless telephone, billing information for the call service is calculated from the moment in time when the call service is completed. The calculated billing information is stored in a non-volatile memory such as an Electrically Erasable and Programmable Read Only Memory (EEPROM). In such a manner, the accumulated charge for call services from a certain point in time (e.g., the point in time when the charge details for previously performed call services have been deleted) is stored. For example, in the case of a Global System for Mobile communications (GSM), the accumulated charge for call services is stored in a non-volatile memory which is internally disposed in a subscriber identity module. Often, subscribers want to know billing information details such as, for example, the service time and the telephone number of the calling (i.e., incoming call) or called (i.e., outgoing call) party for each call service. However, conventional mobile terminals do not manage such billing information by themselves. Accordingly, if a subscriber wants to know billing information details, he or she should request such information from the service company. However, such a request inconveniences the subscriber.

SUMMARY OF THE INVENTION

It is an object of the present invention to provide apparatus and methods for managing billing information for call services performed in a digital portable cordless telephone. In accordance with the present invention, billing information details may be immediately provided to a subscriber via the digital portable cordless telephone for specific call services or for an accumulated service charge encompassing multiple call services.

In accordance with one aspect, an apparatus for managing billing information in a digital portable cordless telephone comprises: a non-volatile memory for storing the billing information, the billing information including a service charge for a specific call service and other billing information details for the specific call service; a completion sensing unit for sensing whether the specific call service is completed; a calculating unit for calculating the service charge for the specific call service; an address generating unit for generating an address at which the service charge is stored, and addresses at which the other billing information details are stored, the address of the service charge for the specific call service being linked to the addresses of the other billing information details for the specific call service; and a display unit for displaying the billing information stored in the non-volatile memory in response to a billing information display request by a user.

In accordance with another aspect, a method for managing billing information of call services in a digital portable cordless telephone having a non-volatile memory comprises the steps of: calculating a service charge for a call service when a completion of the call service is sensed; and storing the calculated service charge in a memory location of the non-volatile memory corresponding to a specified address. The method may further comprise the steps of: searching for an address of the non-volatile memory linked to the specified address at which the calculated service charge is stored; and storing a telephone number associated with the call service in a memory location of the non-volatile memory corresponding to the searched address.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating a memory map for billing information management according to an embodiment of the present invention;

DETAILED DESCRIPTION OF PREFERRED EMBODIMENTS

Figure 1:
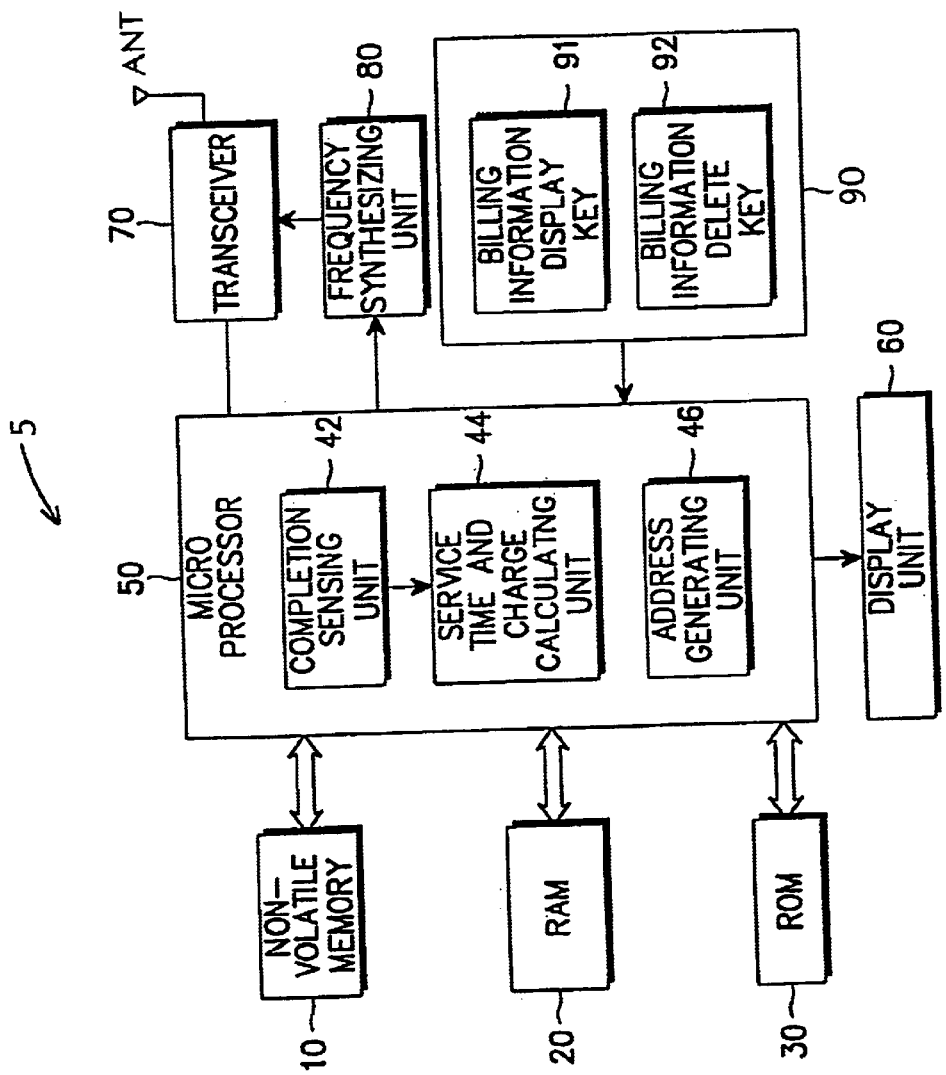
FIG. 1 is a block diagram illustrating an apparatus for managing billing information of call services in a digital portable cordless telephone according to an embodiment of the present invention.

Preferred embodiments of the present invention will be described in detail hereinbelow with reference to the attached drawings, in which like reference numerals represent like elements. In the following description, numerous specific details are set forth by way of example so as to provide a more thorough understanding of the present invention. However, it will be apparent to one skilled in the art of the invention that the invention may be practiced without these specific details. Furthermore, the detailed description of known functions and construction details unnecessarily obscuring the subject matter of the present invention will not be provided in the following description.

FIG. 1 is a block diagram illustrating an apparatus 5 for managing billing information of call services in a digital portable cordless telephone according to an embodiment of the invention. The apparatus 5 includes a microprocessor 50 operatively coupled to a non-volatile memory 10, a random access memory (RAM) 20, a read only memory (ROM) 30, a display unit 60, a transceiver 70, a frequency synthesizing unit 80, and a key input unit 90. The transceiver 70 is operatively coupled to frequency synthesizing unit 80 and an antenna ANT.

The non-volatile memory 10 stores the details of service charges. The microprocessor 50 serves to control the entire operation of the digital portable cordless telephone. The microprocessor 50 also performs a control for displaying billing information for specific (individual) call services as well as for accumulated call services. The microprocessor 50 includes a completion sensing unit 42, a service time and charge calculating unit 44, and an address generating unit 46. The completion sensing unit 42 senses whether or not a specific call service is completed. The service time and charge calculating unit 44 calculates the service time and charge for the specific call service. The address generating unit 46 generates an address at which a service charge for the specific call service is stored in non-volatile memory 10. The address generating unit 46 also generates addresses at which the service time and the telephone number of a calling (i.e., incoming call) or called (i.e., outgoing call) party are stored for each call service. The address at which the service charge is stored is linked to the addresses at which the service time and the calling or called party's telephone number are stored.

The ROM 30 stores a program for controlling intrinsic operations of the digital portable cordless telephone, a program for controlling the display of billing information for specific call services, and initial data. The RAM 20 stores data generated when microprocessor 50 executes the control programs.

The key input unit 90 includes numeral keys for a dialing operation, a calling key, and a variety of function keys. The key input unit 90 also includes a billing information display key 91 and a billing information delete key 92. The display unit 60 is coupled to microprocessor 50 in order to display billing information read from non-volatile memory 10 in response to a key input from billing information display key 91.

The transceiver unit 70 processes radio signals transmitted or received via antenna ANT, and sends the processed signals to microprocessor 50. The frequency synthesizing unit 80, under the control of microprocessor 50, generates a frequency synthesized signal for allocating a transmission/reception channel.

FIG. 2 is a diagram illustrating a memory map for billing information management according to an embodiment of the present invention. The memory map includes memory locations for storing service charges, service times, telephone numbers, and information for determining whether the stored telephone number corresponds to an incoming call, an outgoing call (directly inputted by the subscriber), or a telephone number inputted by the subscriber using a memory (memo) function. In the case of an incoming call, the telephone number corresponds to a number which is received in order to identify the originator of the call. In the memory map, the designation "ADD" represents an address to be allocated for each call service. That is, the address is allocated in response to the storage of data in a memory location corresponding to the last call service when the completion of the last call service is sensed.

Figure 3:
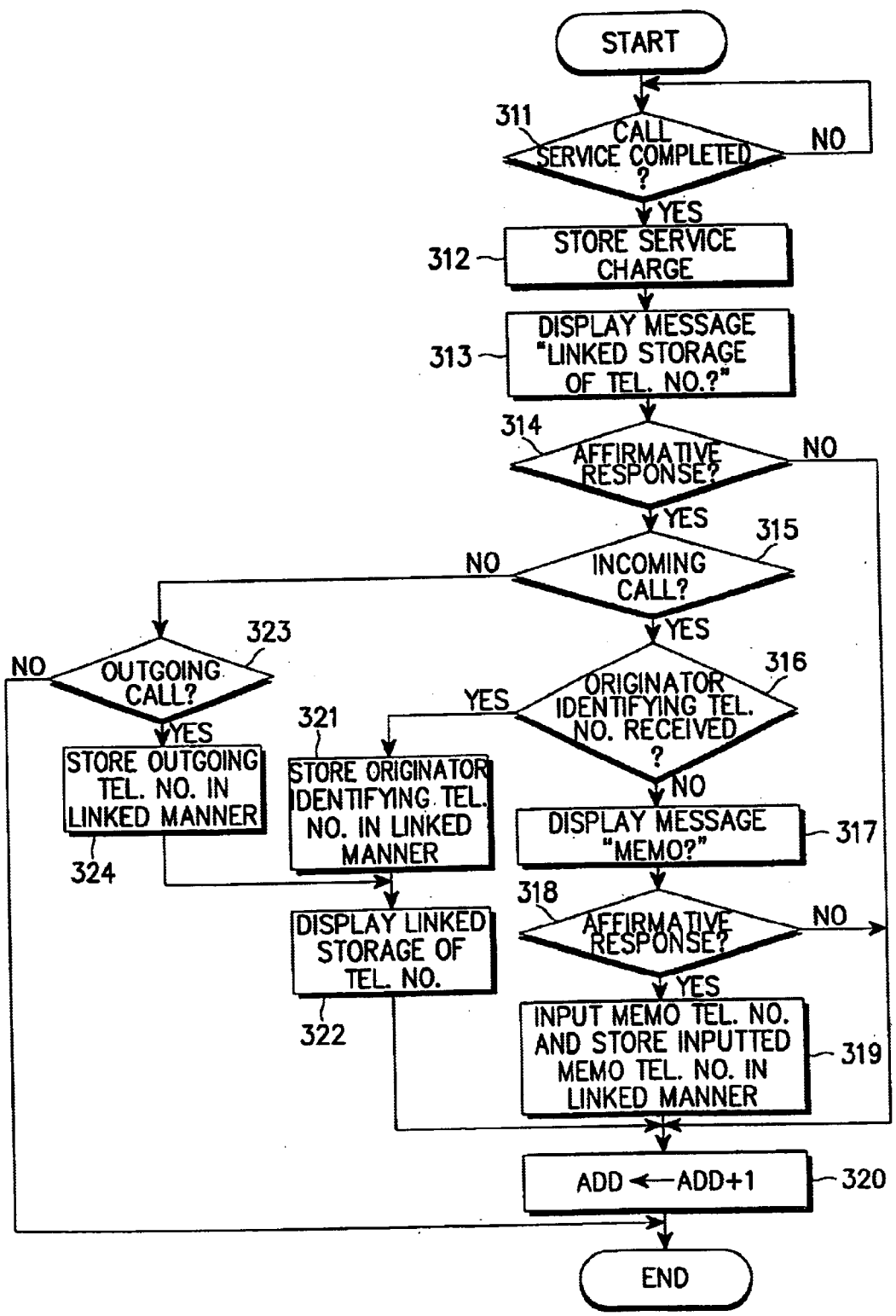
FIG. 3 is a flow chart illustrating a method for managing billing information of call services in a digital portable cordless telephone according to an embodiment of the present invention.

FIG. 3 is a flow chart illustrating a method for managing billing information of call services in a digital portable cordless telephone according to an embodiment of the present invention. The method is performed utilizing the apparatus of FIG. 1.

The microprocessor 50 first determines whether or not the current call service is completed (step 311). If the current call service is completed, then microprocessor 50 calculates the charge for the current call service and stores the calculated charge (step 31 2). The calculated service charge is stored in non-volatile memory 10. Optionally (not shown), the service time for the call service may be calculated and stored, with such storage being performed in such a manner that the stored service time is linked with the stored service charge.

Then, microprocessor 50 sends a message to display unit 60 for determining whether or not a telephone number should be stored in association (i.e., linked) with the stored service charge, thereby displaying the message on display unit 60 (step 313). The displayed message may be previously stored in a desired memory location of non-volatile memory 10. After outputting the message, microprocessor 50 determines whether or not an affirmative response is received from the user interface, i.e., key input unit 90 (step 314). If an affirmative response is not received, then the method proceeds to step 320. However, if an affirmative response is received, then microprocessor 50 searches for an address linked with the address at which the service charge for the current call service is stored, and stores the telephone number of the calling or called party associated with the current call service in a memory location corresponding to the searched address.

It is then determined whether or not the current call service is based on an incoming call (step 315). If the current call service is based on an incoming call, then it is determined whether or not a telephone number identifying the originator of the call service is received from a mobile communication network (step 316). If an originator identifying telephone number is received, then the telephone number is stored in such a manner that it is linked with the stored service charge (step 321).

However, if it is determined at step 315 that the current call service is not based on an incoming call, then it is determined whether or not the current call service is based on an outgoing call (step 323). If the current call service is based on an outgoing call, then the outgoing telephone number is stored in such a manner that it is linked with the stored service charge.

After an incoming or outgoing telephone number is stored and linked to the stored service charge at steps 321 and 324, respectively, information about the linked storage is sent to display unit 60 for display to inform the user of the linked storage (step 322). However, if it is determined at step 316 that a telephone number is not received for identifying the originator of the incoming call, then a memo message read from non-volatile memory 10 is displayed on display unit 60. As an example, the memo message may be a message requesting a response from the user, such as, "memo function ?". Thereafter, it is determined whether or not an affirmative response is received by the user via key input unit 90 (step 318). If an affirmative response is received, then microprocessor 50 receives memo data (e.g., a telephone number) from the user. The received memo data is then stored in such a manner that it is linked with the stored service charge.

Next, an address updating is carried out by incrementing the current address by "1" (step 320). This address updating is executed after the linked storage of the telephone number is displayed at 322, or when there is no affirmative response received at steps 314 or 318.

Figure 4:
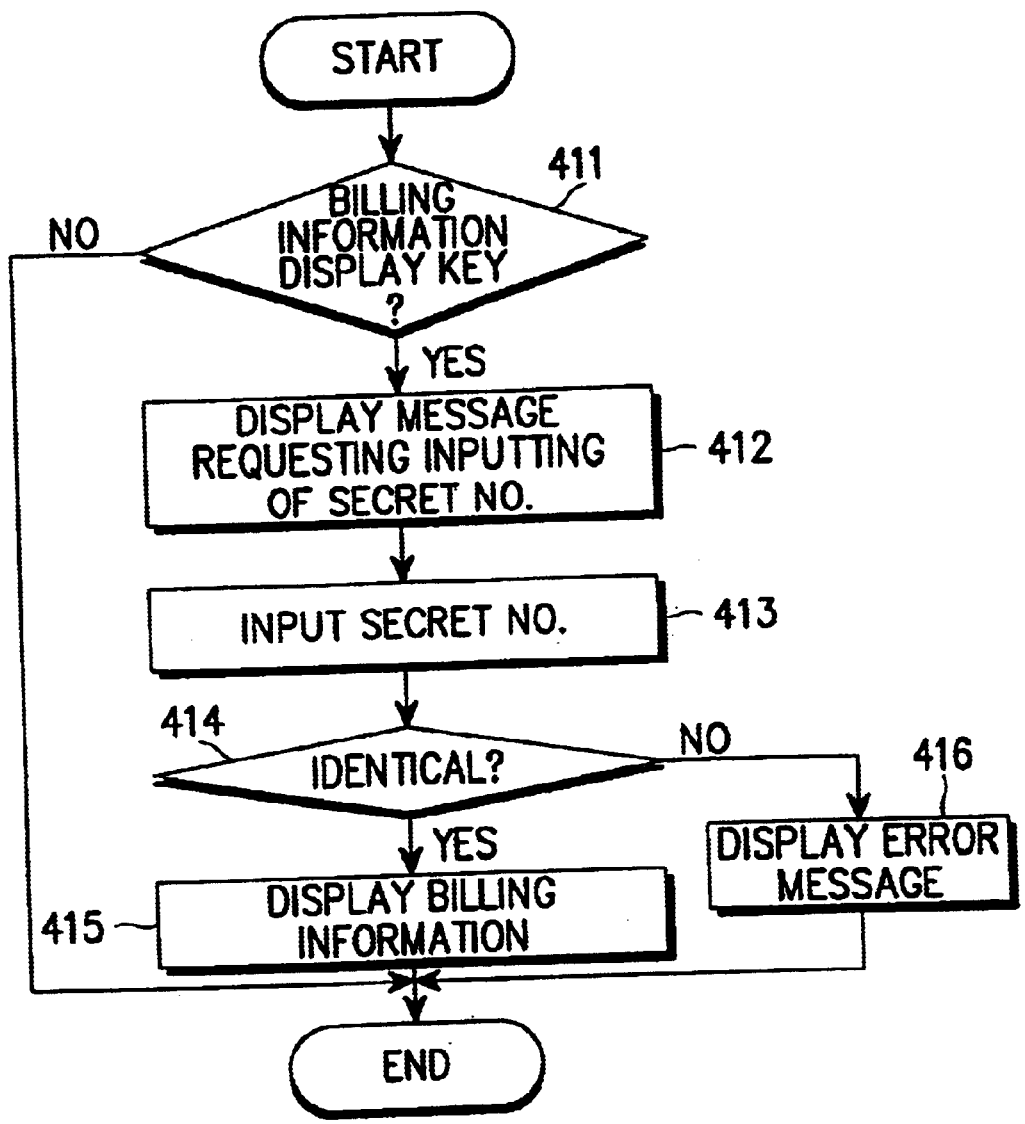
FIG. 4 is a flow chart illustrating a method for controlling the display of billing information in a digital portable cordless telephone according to an embodiment of the present invention.

FIG. 4 is a flow chart illustrating a method for controlling the display of billing information in a digital portable cordless telephone according to an embodiment of the present invention. The method of FIG. 4 is performed utilizing the apparatus of FIG. 1.

Initially, microprocessor 50 scans key input unit 90 to determine whether or not a billing information display key 91 is input (actuated) (step 411). If it is determined that the billing information display key is input, microprocessor 50 sends a message to display unit 60 requesting the inputting of a secret number (password number), thereby displaying the message on display unit 60 (step 412). The displayed message may be previously stored in a desired memory location of non-volatile memory 10. When the user inputs the secret number via key input unit 90, microprocessor 50 senses the inputting of the secret number (step 413). Next, it is determined whether or not the inputted secret number is identical to a previously registered secret number (step 414). If the numbers are determined to be identical, then billing information is sent to display unit 60 so as to display the billing information on display unit 60. However, if the numbers are determined to be different, then an error message is sent to display unit 60 so as to display the error message on display unit 60.

Figure 5:
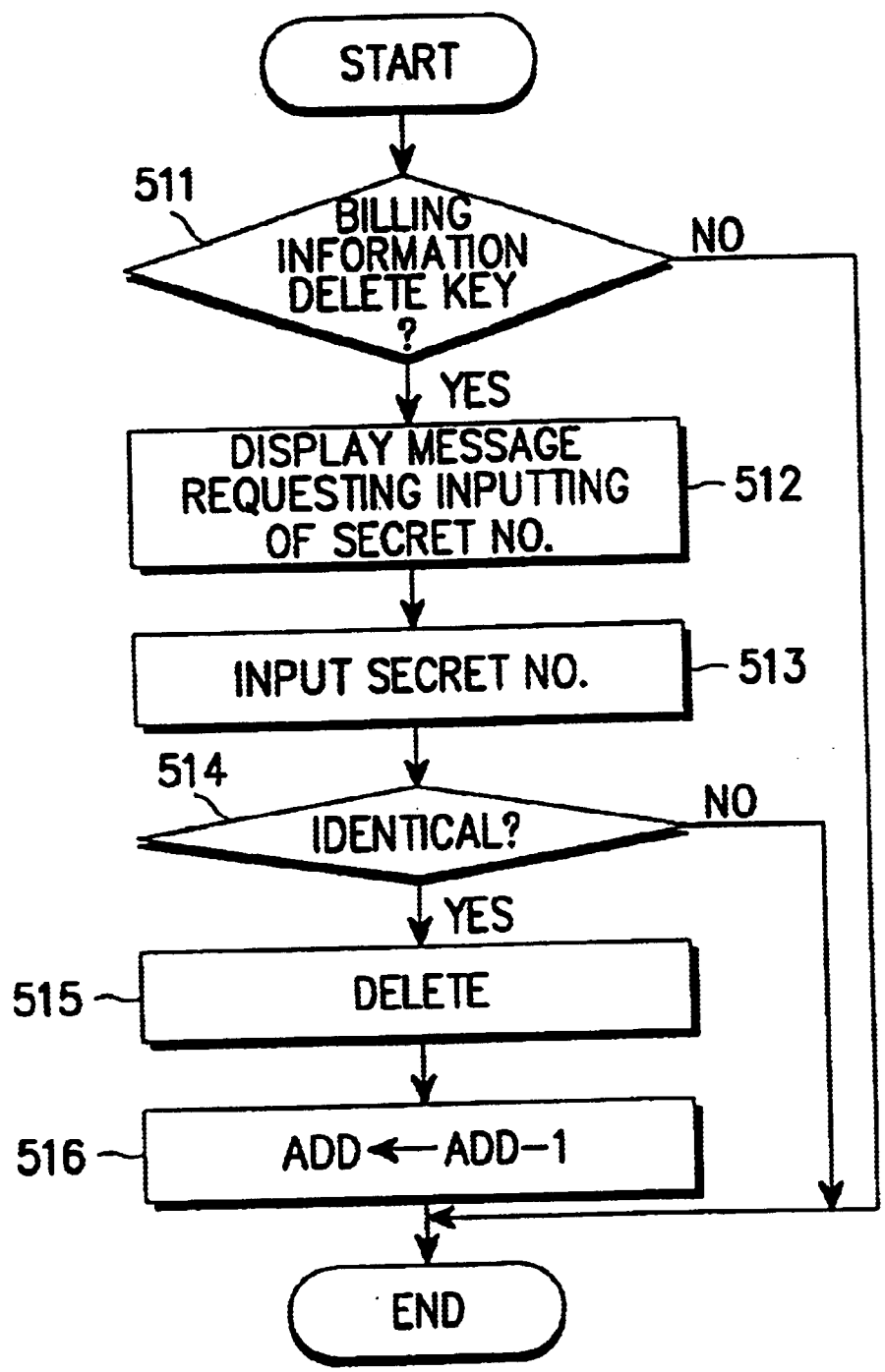
FIG. 5 is a flow chart illustrating a method for controlling the deletion of billing information in a digital portable cordless telephone according to an embodiment of the present invention.

FIG. 5 is a flow chart illustrating a method for controlling the deletion of billing information in a digital portable cordless telephone according to an embodiment of the present invention. The method of FIG. 5 is performed utilizing the apparatus of FIG. 1.

Initially, microprocessor 50 scans key input unit 90 to determine whether or not a billing information delete key 92 is input (step 511). If it is determined that the a billing information delete key is input, then microprocessor 50 sends a message to display unit 60 requesting the inputting of a secret number, thereby displaying the message on display unit 60 (step 512). The displayed message may be previously stored in a desired memory location of non-volatile memory 10. When the user inputs a secret number through key input unit 90, microprocessor 50 senses the inputting of the secret number (step 513). Next, it is determined whether or not the inputted secret number is identical to a previously registered secret number (step 514). If the numbers are determined to be different, then the method is terminated. However, if the numbers are determined to be identical, then the billing information, telephone number, and any other associated information stored at the current address are deleted (step 515). Next, an address updating step is performed by decreasing the current address by "1" (step 516). This address updating step is performed so as to efficiently utilize empty memory space generated by the deletion of information. Therefore, the address updating step is an optional step which may or may not be performed.

As apparent from the above description, the present invention provides apparatus and methods for managing billing information in a digital portable cordless telephone. According to the invention, billing information may be managed by the sub scriber terminal itself for every call service. Further, such billing information may be optionally linked to a calling or called party's telephone number. In accordance with the invention, if a subscriber requests billing information details for a specific call service or a total service charge (encompassing multiple call services), such details may be immediately identified and provided to the subscriber through the terminal itself.

Although preferred embodiments of the invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for managing billing information within a digital portable cordless telephone, the digital portable cordless telephone comprising:

a non-volatile memory for storing the billing information, the billing information including a service charge for a specific call service and other billing information details for the specific call service;

a completion sensing unit for sensing whether the specific call service is completed;

a calculating unit for calculating the service charge for the specific call service;

an address generating unit for generating an address at which the service charge is stored, and address at which the other billing information details are stored, the address of the service charge for the specific call service being linked to the addresses of the other billing information details for the specific call service; and a display unit for displaying the billing information stored in the non-volatile memory in response to a billing information display request by a user.

2. The apparatus of claim 1, wherein the other billing information details comprise at least one of a telephone number of a calling party and a called party.

3. The apparatus of claim 1, wherein the other billing information details comprise at least a service time.

4. The apparatus of claim 1, wherein the calculating unit calculated an accumulated service charge for a plurality of call services, the accumulated service charge being stored in the non-volatile memory, and the accumulated service charge being displayed on the display unit in response to an accumulated billing information display request by the user.

5. A method for managing billing information of call services in a digital portable cordless telephone, the telephone having a non-volatile memory, the method comprising the steps of:

(a) calculating a service charge for a call service when a completion of the call service is sensed;

(b) storing the calculated service charge in a memory location of the non-volatile memory corresponding to a specified address;

(c) providing a message to a user requesting whether the user desires a telephone number associated with the call service to be stored in the non-volatile memory; and (d) searching for an address of the non-volatile memory linked to the specified address at which the calculated service charge is stored and storing the telephone number in a memory location of the non-volatile memory corresponding to the searched address, when an affirmative response is received corresponding to the message.

6. The method of claim 5, further comprising the steps of:

(e) searching for an address of the non-volatile memory linked to the specified address at which the calculated service charge is stored; and (f) storing a telephone number associated with the call service in a memory location of the non-volatile memory corresponding to the searched address.

7. The method of claim 6, wherein the telephone number corresponds to one of a calling party and a called party, the telephone number corresponding to the calling party being provided by a mobile communication network.

8. The method of claim 5, wherein the message is provided to the user through a display unit.

9. The method of claim 5, wherein an affirmative response is received though a user interface.

10. The method of claim 5, wherein the telephone number corresponds to one of a calling party and a called party, the telephone number corresponding to the calling party being provided by a mobile communication network.

11. The method of claim 5, further comprising the steps of:

(e) inputting desired memory data by a user; and (f) storing the memory data so that the address at which the memory data is stored is linked to the address at which the service charge is stored.

12. The method according to claim 5, further comprising the steps of:

(e) sending information indicative of the linked storage of the telephone number to the display unit.

13. A method for displaying billing information in a digital portable cordless telephone, the telephone managing the billing information and having a non-volatile memory for storing the billing information, the method comprising the steps of:

(a) determining whether a billing information display key is input, after the billing information for a specific call service is stored in response to a completion of the specific call service;

(b) displaying a message on a display unit requesting a user secret number be inputted, when the billing information display key is input;

(c) determining whether the user secret number is identical to a previously registered secret number, when the user secret number is inputted in response to the message; and (d) displaying one of the billing information and an error message on the display unit, based on a result of said determining step (c).

14. The method according to claim 13, wherein the billing information comprises at least one of a service charge, a service time, and a telephone number associated with the call service.

* * * * *